Jan. 25, 1927.
H. CUMMER
1,615,572
INDICATOR FOR MEASURING INSTRUMENTS
Filed March 2, 1925     3 Sheets-Sheet 1
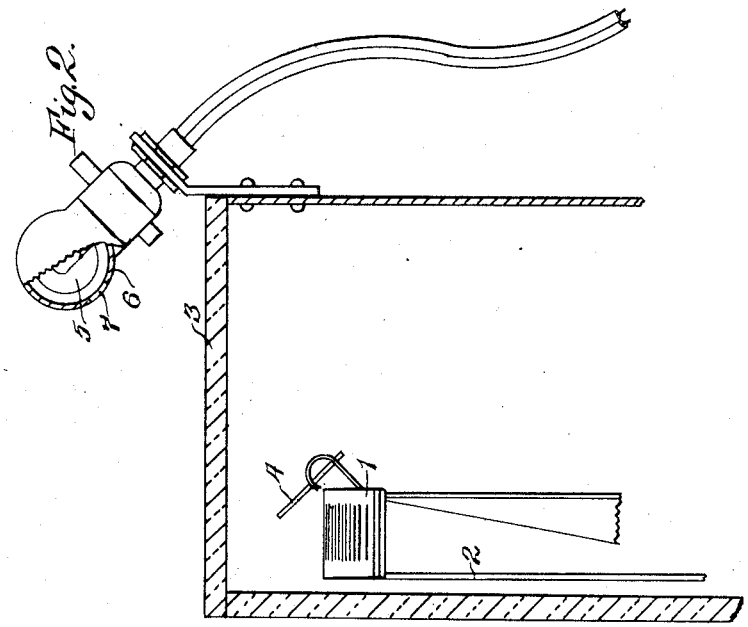
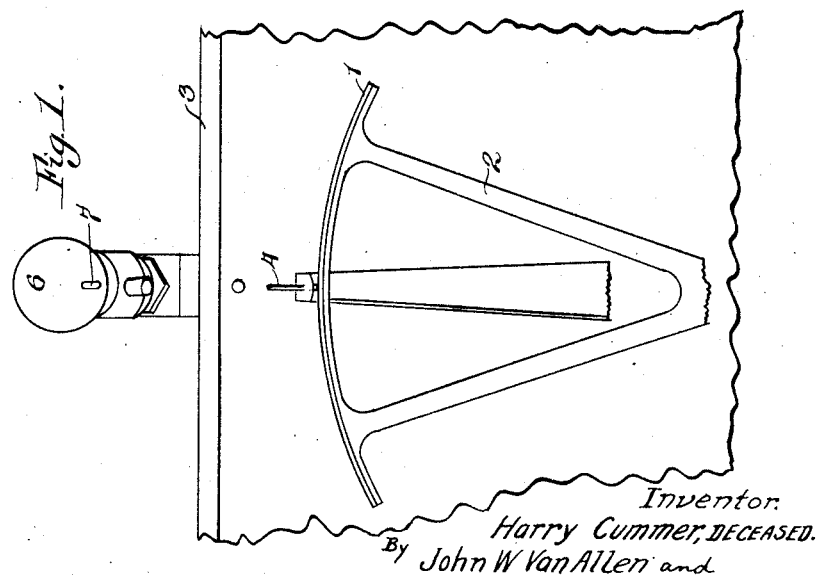
Inventor:
Harry Cummer, DECEASED.
By John W. Van Allen and
Harry W. Cummer, EXECUTORS.
by Popp and Powers.
Attorneys.

Jan. 25, 1927.　　　　　　　　　　　　　　　　1,615,572
H. CUMMER
INDICATOR FOR MEASURING INSTRUMENTS
Filed March 2 1925　　　3 Sheets-Sheet 2
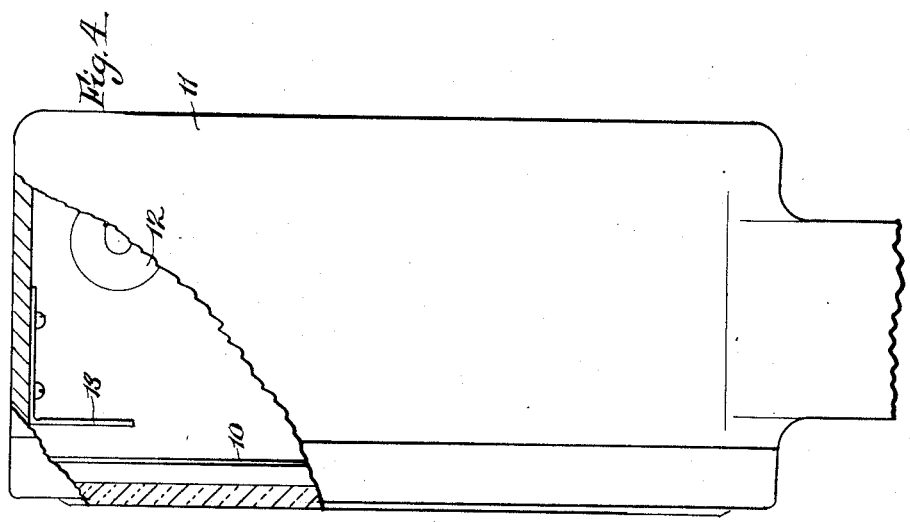
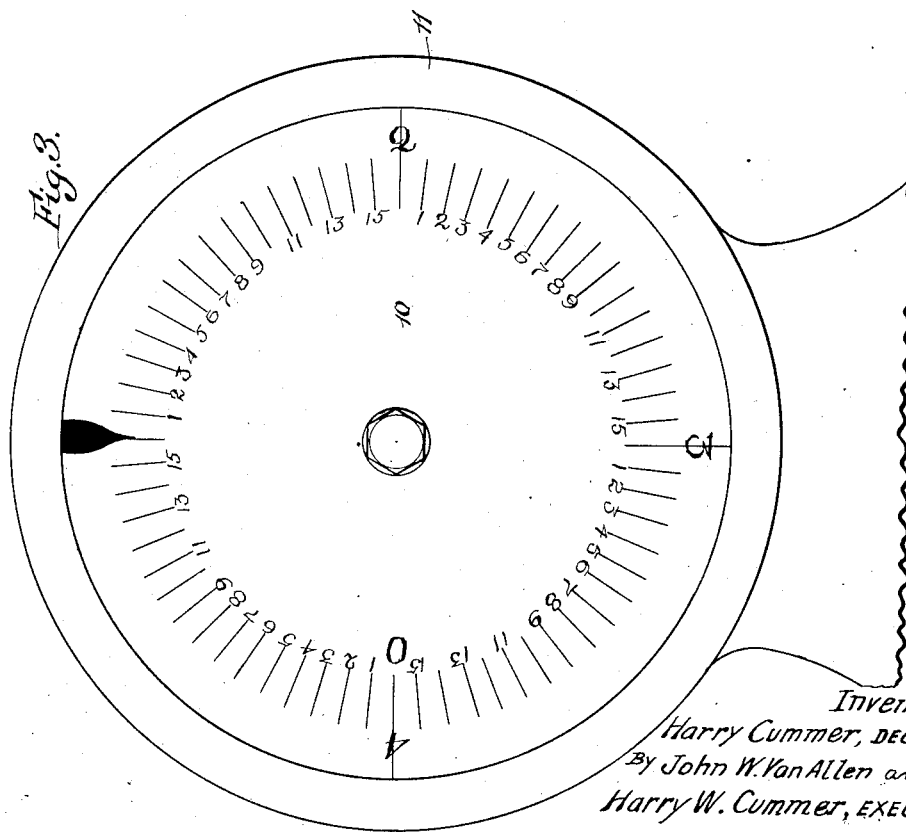
Inventor.
Harry Cummer, DECEASED.
By John W. Van Allen and
Harry W. Cummer, EXECUTORS
by Popp and Powers.
Attorneys.

Jan. 25, 1927.
H. CUMMER
1,615,572
INDICATOR FOR MEASURING INSTRUMENTS
Filed March 2, 1925   3 Sheets-Sheet 3
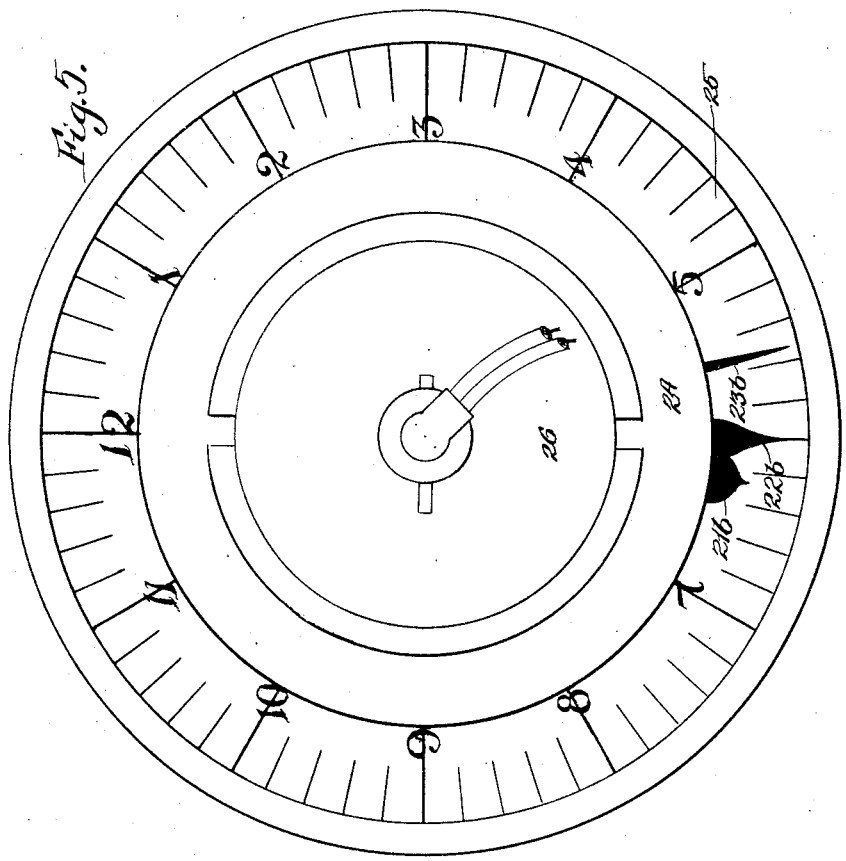
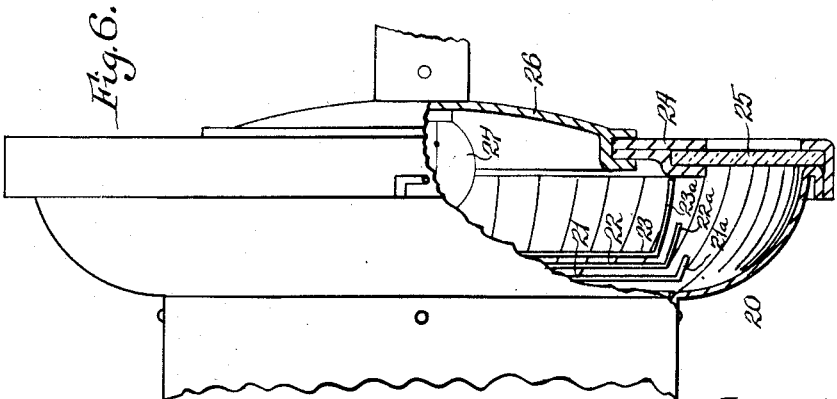
Inventor
Harry Cummer, DECEASED.
By John W. Van Allen and
Harry W. Cummer, EXECUTORS.
by Popp and Powers.
Attorneys.

Patented Jan. 25, 1927.

1,615,572

UNITED STATES PATENT OFFICE.

HARRY CUMMER, DECEASED, LATE OF BUFFALO, NEW YORK; BY JOHN W. VAN ALLEN, OF BUFFALO, NEW YORK, AND HARRY W. CUMMER, OF DETROIT, MICHIGAN, EXECUTORS.

INDICATOR FOR MEASURING INSTRUMENTS.

Application filed March 2, 1925. Serial No. 12,757.

This invention relates to indicators for measuring instruments. The improvements are directed to indicators of the kind which consist of a graduated chart and a pointer movable relatively thereto, the chart and the pointer constituting companion co-operating elements. The term "measuring instruments" is used herein generically, that is to say as a designation of an instrument by which values are determined and indicated and thus includes, for example, weighing machines, clocks and various scientific instruments which employ an indicator of the kind described.

A serious objection to the use of such indicators as heretofore known rises from the difficulty of taking an accurate reading due to the parallax of the pointer which has an apparent displacement when the eye changes position.

The object of the present invention is to provide an indicator of simple construction in which this objection is completely overcome and a reading of invariable and absolute accuracy is given.

With this object in view the invention is characterized by the employment in connection with the indicator of a source of light and by the arrangement of the pointer substantially out of the line of vision and between the source of light and the chart with which the pointer co-operates, the pointer and the source of light being perferably fixed relatively to one another. Thereby the shadow of the pointer is cast on the chart in the line of vision and to the eye constitutes the true pointer, the reading being taken as of the position of the shadow relatively to the chart.

The invention is illustrated in the accompanying drawings, wherein:—

Figure 1 is a front elevation and,

Figure 2 is a vertical section showing the indicator in connection with a weighing scale in which the chart is mounted on a rocker arm.

Figure 3 is a front elevation and,

Figure 4 is a view partly in side elevation and partly in vertical section showing the indicator in connection with a weighing scale in which the chart is rotatably mounted.

Figure 5 is a front elevation and,

Figure 6 is a view partly in side elevation and partly in vertical section showing the indicator in connection with a clock having a sweep second hand.

Figures 1 and 2 assume a rocker beam weighing scale of the general type disclosed in the patents of Harry Cummer, Nos. 1,076,486 of October 21, 1913, 1,185,634 of June 6, 1916, and 1,451,684 of April 17, 1923. The indicator includes a chart 1 which is carried by a pivoted arm 2 suitably operated from the rocker beam (not shown), the chart being visible through the transparent top 3 of the casing in which the mechanism is enclosed. The indicator also includes a pointer 4 and a source of light 5. The pointer 4 and lamp 5 are in fixed relation to one another and in the construction disclosed the pointer is stationary. The pointer 4 is arranged substantially beyond the line along which the chart is viewed through the glass top 3 and is placed between the chart and the lamp 5 so that the shadow of the pointer will fall upon the chart, the arrangement of the pointer being such that its shadow extends as a sharply defined line transversely across the chart and parallel to the marks of the graduations. The sharpness of the shadow is accentuated by employing in connection with the lamp 5 a reflector 6 which encases said lamp and has a narrow slot 7 through which a beam of light is emitted, the pointer 4 being in the path of such beam, the light of which illuminates the chart at each side of the shadow cast by the pointer and thereby facilitates the reading of the indicator, the accuracy of such reading being due to the fact that it is taken at the point where the shadow crosses the chart.

Exactly the same principle is employed in the construction shown in Figures 3 and 4 wherein the chart of the indicator is in the form of a translucent plate 10 which is mounted for turning movement and is operated by suitable connections with the scale mechanism, the plate 10 being provided with the usual value indications and graduations. The plate 10 is mounted in the casing 11 in which is fitted a lamp 12. The indicator is completed by a pointer 13 which is arranged behind the chart and between the same and the lamp 12 so that the shadow of the pointer, illustrated in solid black in Figure 3, will be cast upon the chart and will be visible from the front of the instrument owing to the translucency of the chart. The reading, as in the previous embodiment, is taken as of the position of the shadow relatively to the chart and the visibility of the indication is aided by the illumination supplied by the lamp 12.

Figures 5 and 6 show a clock having a dial face 20, an hour hand 21, a minute hand 22 and a sweep second hand 23. The face of the clock is covered in the usual manner by a door 24 having a glass panel 25 through which the dial is visible. The door 24 is provided with a centrally arranged reflector 26 within which is fitted a lamp 27, the lamp being enclosed when the door is closed. The reflector 26 and the parts by which the reflector is mounted conceal the hands 21, 22 and 23 and these are provided at their outer ends with forward extensions 21ª, 22ª and 23ª by which shadows are cast on the dial 20, said dial preferably having a concave face. The shadows cast by the extensions 21ª, 22ª and 23ª are shown in Figure 5 in solid black and are indicated at 21ᵇ, 22ᵇ and 23ᵇ, respectively In this arrangement, as in the preceding constructions, the parts which cast the shadows, corresponding to the pointers of the preceding constructions, are arranged out of the line of vision and between the lamp and the chart, in this instance the clock dial from which the reading is to be taken, and the reading taken is as of the position of the shadows relatively to the chart.

What is claimed is:—

1. An indicator for measuring instruments comprising a relatively movable chart and pointer constituting companion co-operating elements in combination with a source of light, the pointer and the source of light being fixed relatively to one another and the pointer being arranged out of the line along which the chart is viewed and between the chart and the source of light whereby the shadow of the pointer falls across the chart and the reading is taken as of the location of the shadow relatively to the chart.

2. An indicator for measuring instruments comprising a chart and pointer co-operating therewith and a source of light between which and the chart the pointer is arranged, the pointer being outside of the line along which the chart is viewed and the shadow of the pointer falling across the chart, said chart, pointer and source of light constituting companion elements and one of the companion elements being movable relatively to the others whereby the reading is taken as of the location of the shadow relatively to the chart.

Witness my signature at Buffalo, Erie County, New York, this 19th day of February, 1925.

JOHN W. VAN ALLEN,
*Executor of the Estate of Harry Cummer, deceased.*

Witness my signature at Detroit, Wayne County, Michigan, this 25th day of February, 1925.

HARRY W. CUMMER,
*Executor of the Estate of Harry Cummer, deceased.*